Jan. 21, 1930.　　　L. E. SAVAGE　　　1,744,579
TWO-ROW LISTER CULTIVATOR
Filed Aug. 23, 1928　　6 Sheets-Sheet 1
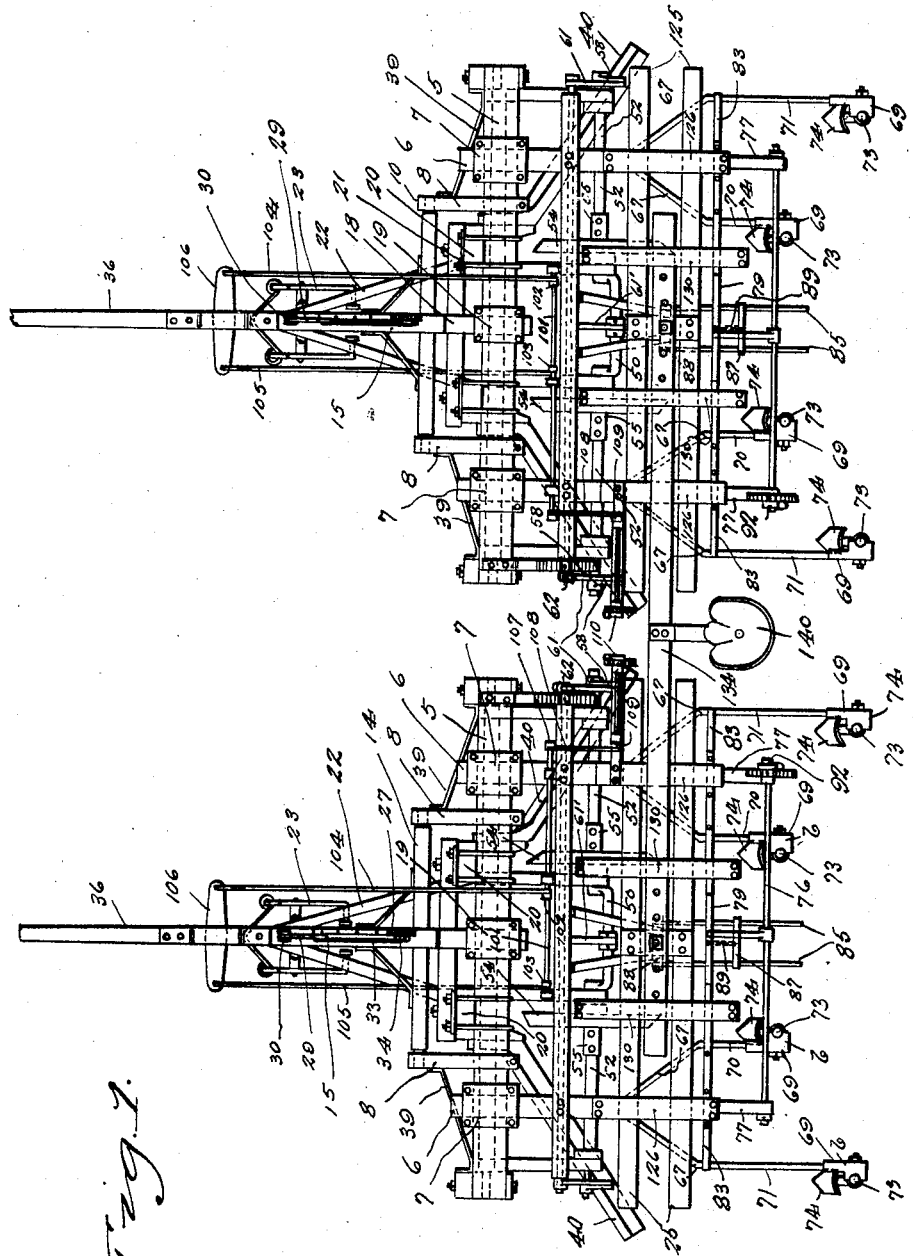
Inventor
*Lowell E. Savage*
By *Clarence A. O'Brien*
Attorney Jan. 21, 1930.  L. E. SAVAGE  1,744,579
TWO-ROW LISTER CULTIVATOR
Filed Aug. 23, 1928  6 Sheets-Sheet 2
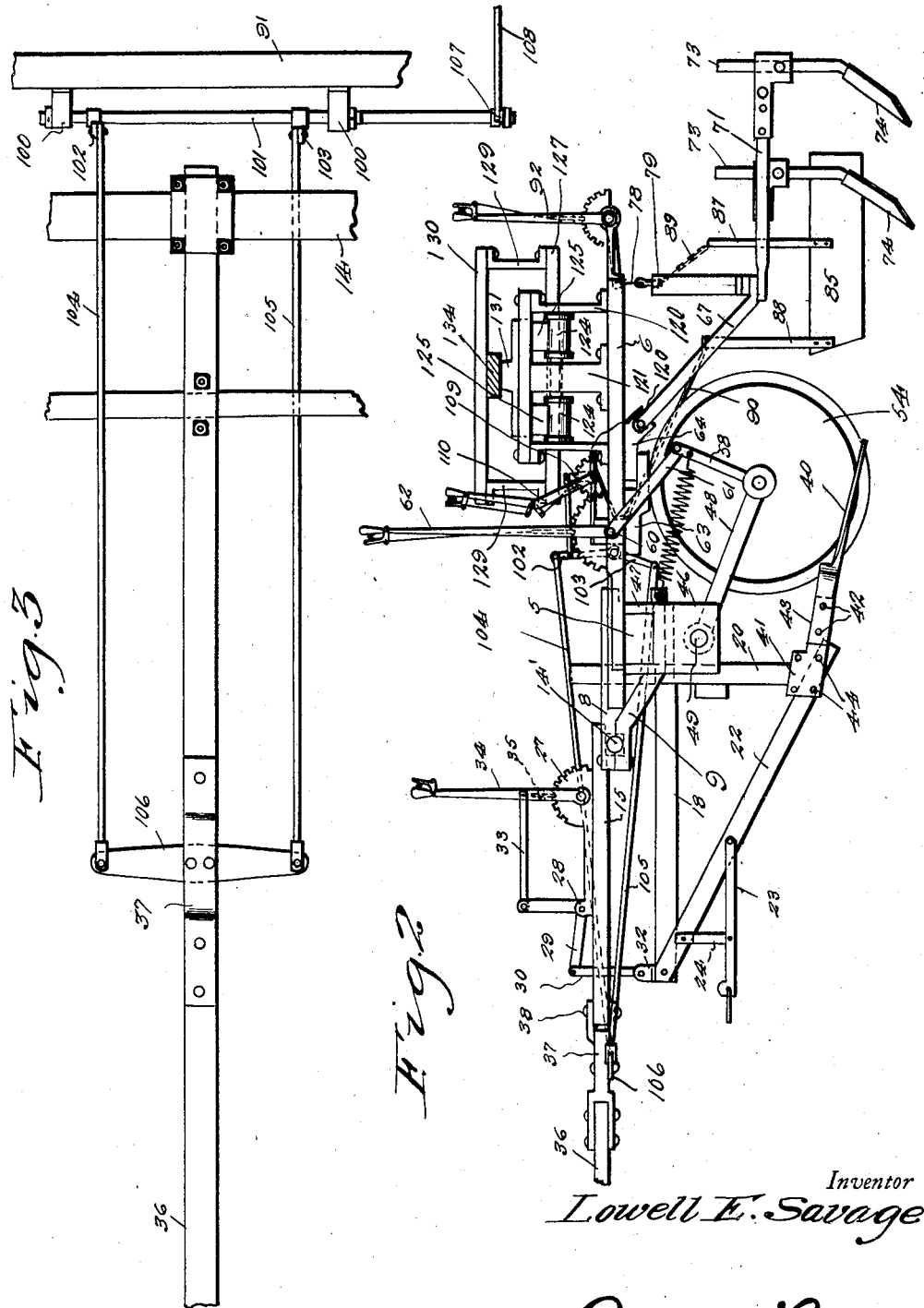
Inventor
Lowell E. Savage
By Clarence A. O'Brien
Attorney

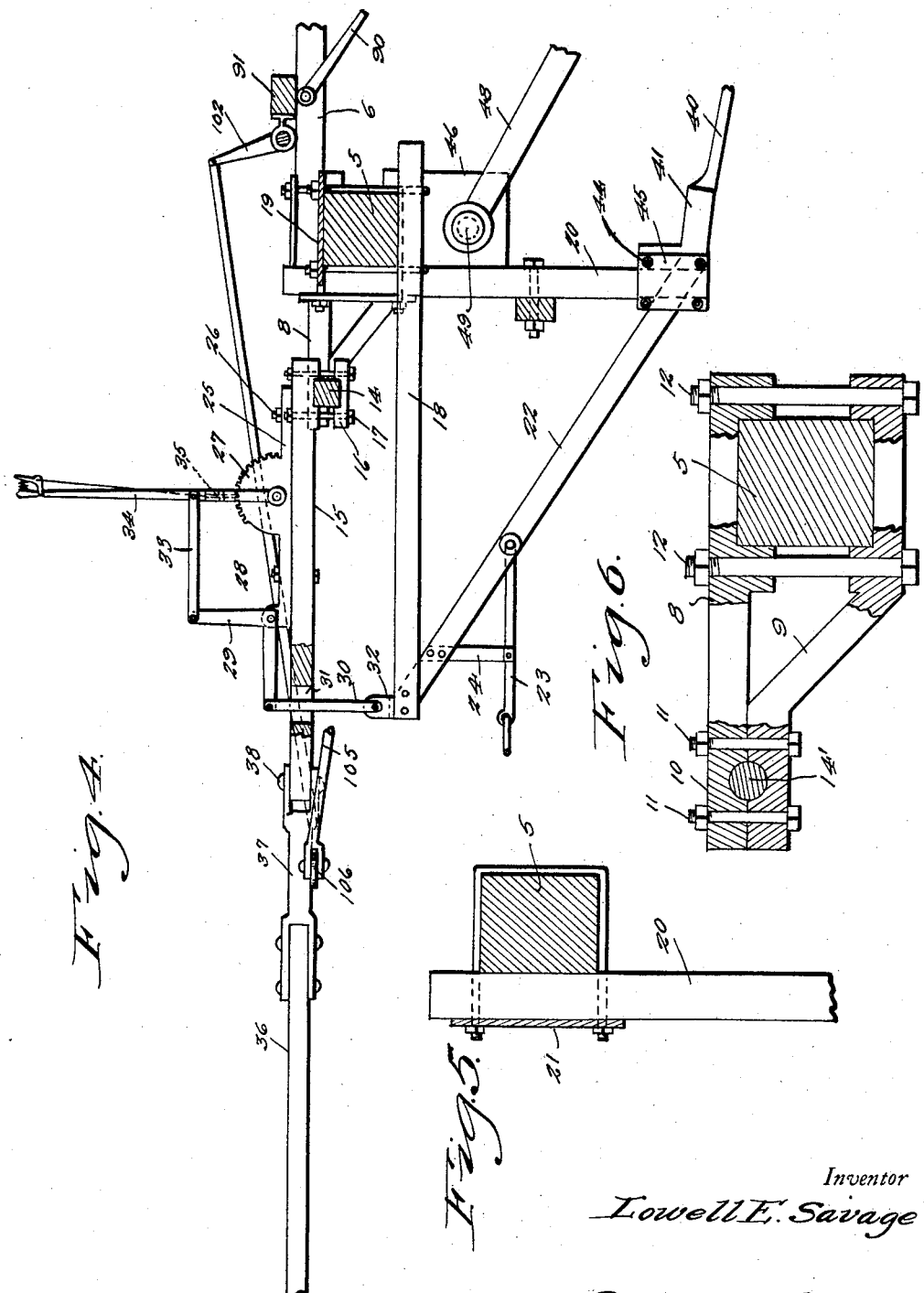

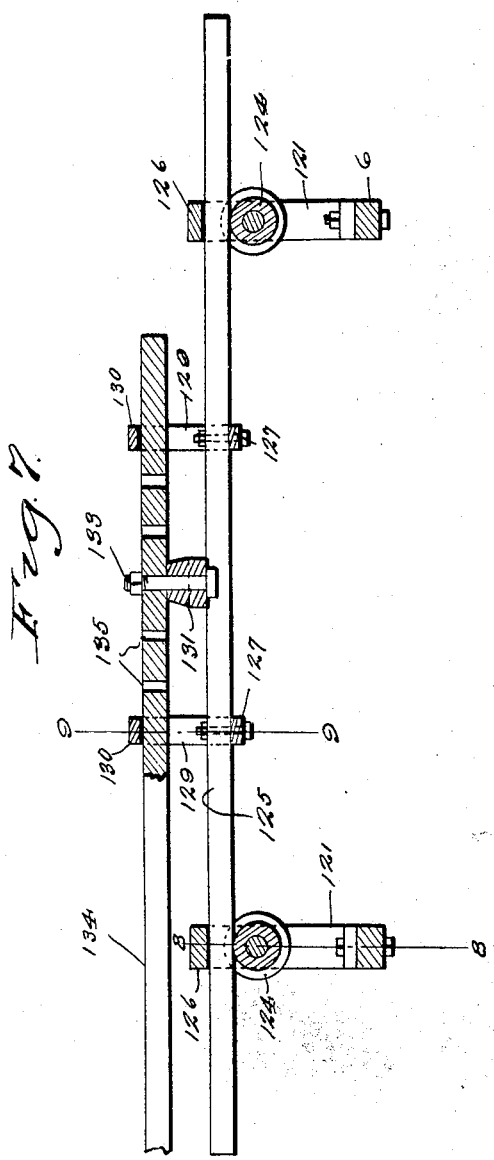
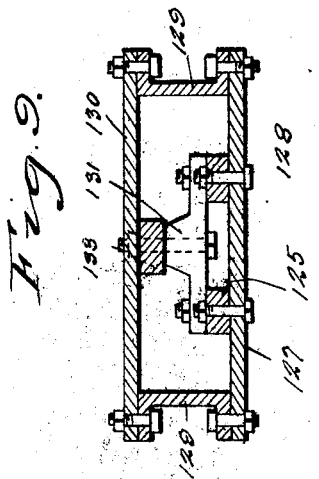
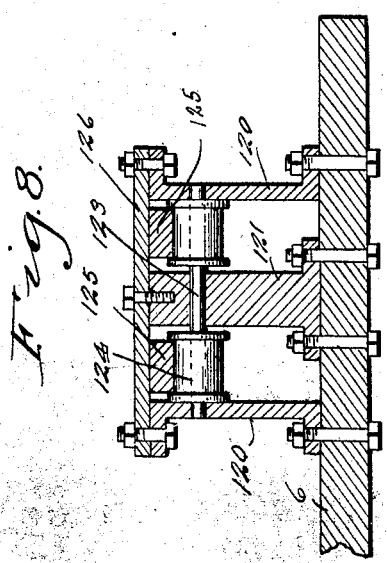

Jan. 21, 1930.  L. E. SAVAGE  1,744,579
TWO-ROW LISTER CULTIVATOR
Filed Aug. 23, 1928   6 Sheets-Sheet 5
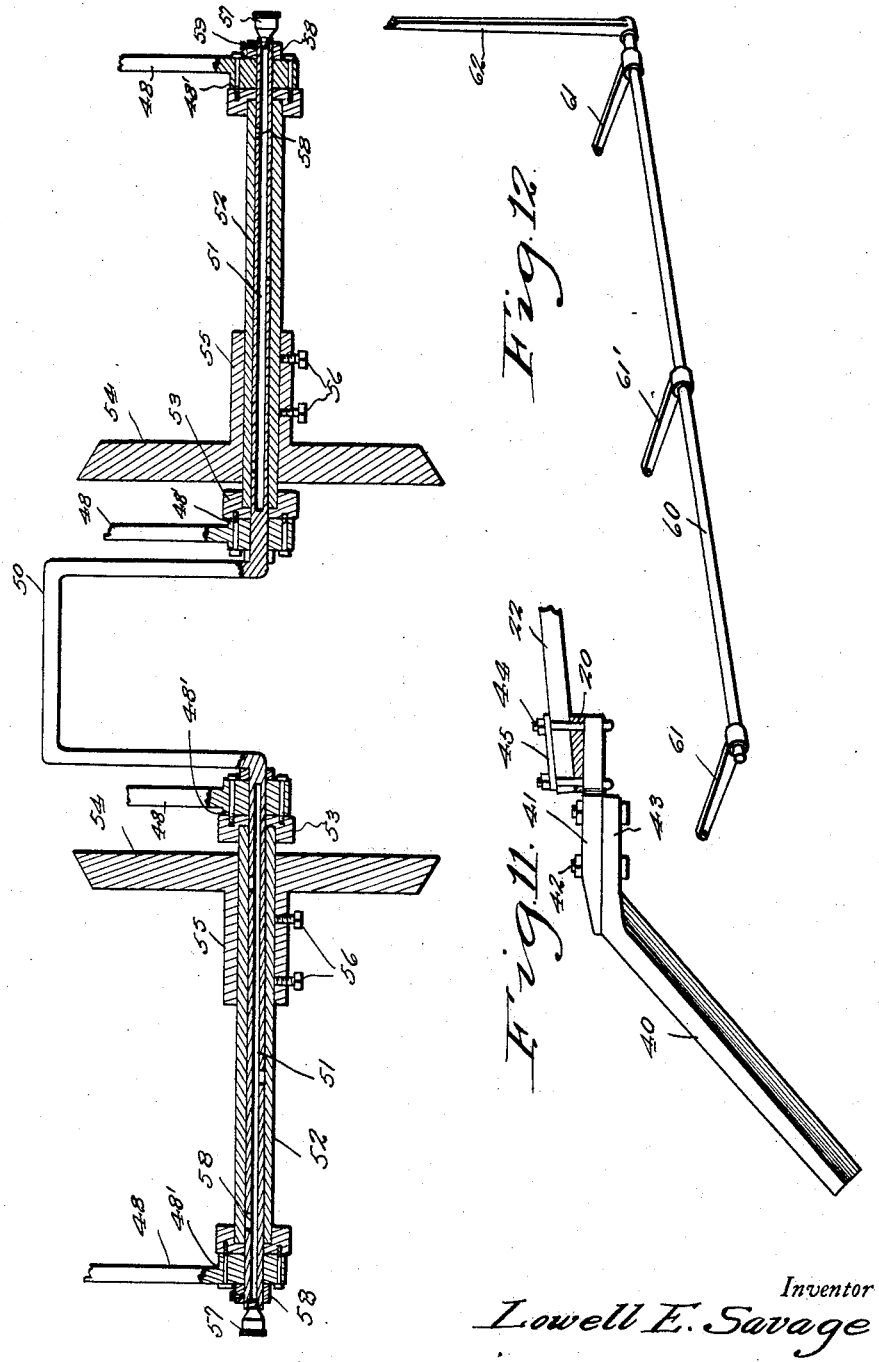
Inventor
Lowell E. Savage
By Clarence A. O'Brien
Attorney

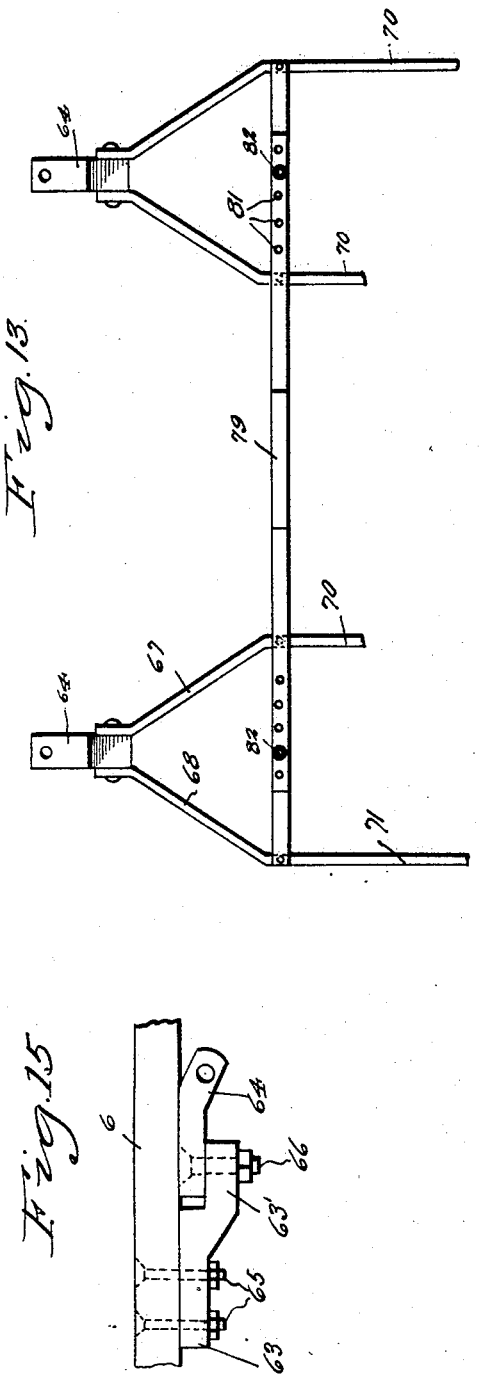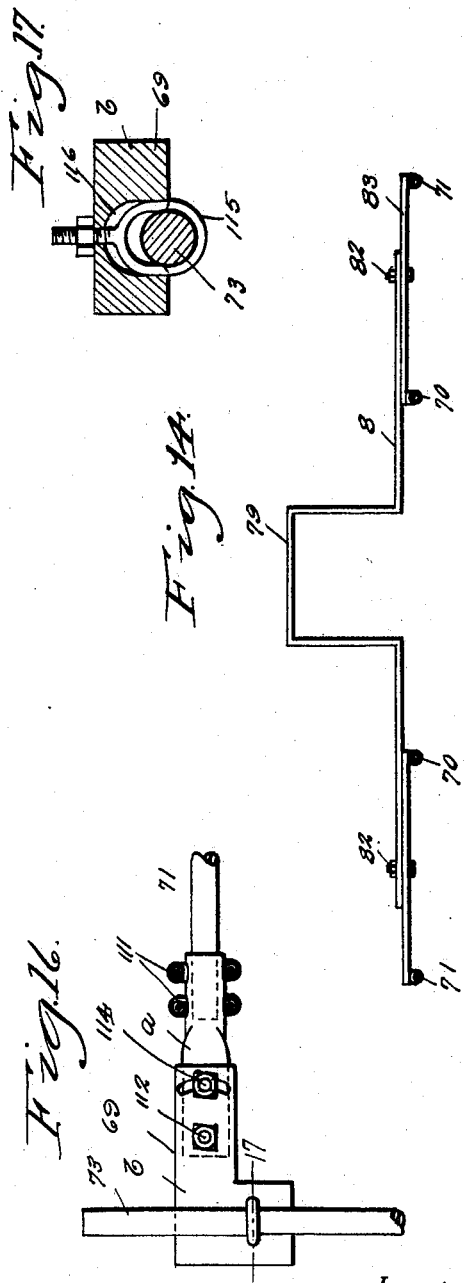

Patented Jan. 21, 1930

1,744,579

UNITED STATES PATENT OFFICE

LOWELL ENLO SAVAGE, OF ARLIE, TEXAS

TWO-ROW LISTER CULTIVATOR

Application filed August 23, 1928. Serial No. 301,513.

The present invention relates to a two-row lister cultivator and has for its prime object to provide an apparatus of this nature formed in two units disposed alongside of each other with means adjustably connecting the units so that the space therebetween may be varied to suit circumstances.

Another very important object of the invention resides in the provision of a cultivator of this nature including a frame structure having cultivating implements mounted thereon and knives mounted thereon forwardly of the cultivating implement.

Another very important object of the invention resides in the provision of a cultivator unit provided with a draft tongue and means whereby the unit may be swung in respect to the tongue for steering purposes and also means whereby the unit may be swung in relation to the tongue to control the depth of the cultivating implement.

A still further very important object of the invention resides in the provision of a two-row lister cultivator of this nature which is comparatively simple in construction, affords a plurality of desirable adjustments, is easy to manipulate, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereiafter more fully described and claimed.

In the drawings—

Figure 1 is a top plan view of the cultivator embodying the features of my invention, Figure 2 is a vertical longitudinal section therethrough showing one of the units in side elevation, Figure 3 is an enlarged detail view of the steering apparatus, Figure 4 is an enlarged fragmentary longitudinal vertical section through the forward portion of one of the units, Figure 5 is an enlarged detail section through one of the cross bars showing the means for attaching a standard thereto, Figure 6 is an enlarged detail sectional view through the cross bar showing forwardly directed frame member secured thereto, Figure 7 is a longitudinal section through the adjustable connecting means between the units, Figure 8 is a sectional view taken substantially on the line 8—8 of Figure 7, Figure 9 is a sectional view taken substantially on the line 9—9 of Figure 7, Figure 10 is a detail sectional view of the axle shaft and the wheels thereon, Figure 11 is a detail section through one of the standards showing the knife attached thereto in top plan, Figure 12 is a perspective view of a rock shaft with cranks thereon, Figure 13 is a fragmentary plan view of the implement beams, Figure 14 is an elevation of the connecting member for said implement means, Figure 15 is an enlarged detail fragmentary view showing the connection of the beams with one of the frame bars, Figure 16 is an enlarged detail fragmentary view showing the means for attaching an implement shank to one of the beams, and Figure 17 is a sectional view taken substantially on the line 17—17 of Figure 16.

The apparatus includes two units of practically the same construction but I shall only describe one in detail for ease of understanding and then I shall explain the cooperating features and connections of the unit.

The numeral 5 denotes a cross frame bar. Longitudinal frame bars 6 have their forward ends secured to the bar 5 by suitable means 7.

Frame bars 8 project forwardly from the bar 5. Brace bars 9 project forwardly from the bar 5 and incline upwardly to meet the forward ends of the bars 8 and form therewith bearings 10, the meeting ends being bolted together as at 11.

The rear ends of the bars 8 and 9 are preferably clamped on the bar 5 by bolts 12. A square shaft 14 has rounded ends 14' journaled in the bearings 10. A stub tongue 15 has its rear end attached to the center of the shaft 14 by a plate 16 and bolt 17. An auxiliary stub tongue 18 projects forwardly from the bar 5 under the stub tongue 15.

The auxiliary stub tongue 18 is rigidly attached to the bar 5 by suitable means 19. Two standards 20 are rigidly attached to the bar 5 by suitable means 21, one to each side of the auxiliary stub tongue 18.

Braces 22 extend from the lower ends of the standards to the forward end of the auxiliary tongue 18. A hitch 23 is attached to the braces 22 and brace in a rigid manner, as at 24.

A bracket 25 is bolted as at 26 to the rear portion of the stub tongue 15 and includes an intermediate tooth segment 27 and a forwardly disposed lug 28.

A bell crank lever 29 is pivoted on the lug 28. A link 30 is pivoted on one end of the bell crank 29, passes through an opening 31 in the forward portion of the stub tongue 15, and is pivoted to a bracket 32 on the forward end of the auxiliary stub tongue 18.

A link 33 is pivoted to the other end of the bell crank lever and to an intermediate portion of a lever 34. A suitable detent structure 35 is mounted on the lever 34 to engage the toothed segment 27 whereby the lever 34 may be held in different adjusted positions.

A main tongue 36 has a casting 37 extending rigidly and rearwardly therefrom. This casting 37 is pivoted as at 38 to the forward end of the stub tongue 15 to swing only in a substantially horizontal plane.

Obviously by rocking the lever 34, the frame structure thus far described, may be tilted forwardly or rearwardly to accommodate draft animals of various sizes. Braces 39 are disposed between the bars 8 and the bar 5.

Two knives are rigidly attached to the lower ends of the standards 20 and diverge rearwardly from each other. These knives 40 are attached as best shown in Figure 11 by plates 41 bolted as at 42 to offset ends 43 of the knives 40 and U-shaped bolts 44 and plates 45 rigidly secure the plates 41 and braces 42 on the standards 20 and obviously the bolts may be loosened for adjusting the knives as may be required under different working conditions.

Bearings 46 depend from the ends of the bar 5, said bearings having upstanding projections 47 straddling the bars 5 and 6 thereto. Arms 48 have a shaft 49 at their upper ends in the bearings 46, the other ends of the arms terminate in bearings 48'. An axle shaft includes an inverted U-shaped central portion 50 merging at its ends into hollow straight alined extensions 51 directed outwardly from each other.

The ends of the extensions 51 are rockable in bearings 48'. Sleeves 52 circumvent the extensions 51 and have their ends journaled in dust caps 53 fixed to the bearings 48'.

Wheels 54 have elongated hubs 55 circumjacent the sleeves 52 and may be locked thereto by set screws 56. These cups 57 are engaged in the outer ends of the extensions 51 and these extensions have orifices to feed lubricant to the rotatable sleeves 52.

Links 58 are secured on the outer ends of the extensions 51 by set screws 59 and incline upwardly and rearwardly. A shaft 60 is journaled through the forward portions of the frame bars 6 and has cranks 61 on the ends thereof connected with the upper ends of the links 58.

A hand lever 62 is fixed to the shaft 60 so that the shaft may be rocked to cause arms 48 to swing thus lifting or lowering the frame. A crank 61' is fixed to the shaft 60 and has a direct connection with the bight of the U-shaped portion 50. Brackets 63 are bolted as at 65 (see Figure 15) under the frame bars 6 and angular members 64 are pivoted to downwardly offset ends 63' by vertical bolts 66.

A pair of beams 67 and 68 is pivoted to each member 64, one on each side thereof, the rear portions 70 and 71 respectively of the beams being in spaced parallelism and the front portions converging toward each other and the member 64 and are inclined upwardly and forwardly.

The rear portions of the beams 67 are shorter than the corresponding portions of the beams 68 and are pivoted thereto. Brackets 69 on the rear ends of the rear portions 70 and 71 adjustably hold shank 73 of the cultivating or other ground working implements 74.

A shaft 76 is rockable in brackets 77 projecting rearwardly from the frame bars 6 and have a crank projecting therefrom connected by a chain 78 to the arch center portion 79 of a connecting rod 80.

The end portions of the rod 80 have series of openings 81 to receive bolts 82 from cross rods 83 between the beams 67 and 68. Fenders 85 are disposed between the two inner sets of implements 74.

Arch connecting rods 87 and 88 are fixed to the fenders. A chain 89 connects the rod 87 and the arched central portion 79. A rod 90 connects the rod 88 and a cross bar 91 on the bars 6.

Therefore, when a lever 92 is actuated to rock the shaft 76 the implement 74 and the fenders 85 are lifted or lowered in respect to the ground.

Bearings 100 project forwardly from the cross bar 91 and have journaled therein a rock shaft 101. A crank 102 rises from this rock shaft 101, and a crank 103 extends in an opposite direction therefrom.

Links 104 and 105 are pivotally connected with the extremities of cranks 102 and 103 respectively and extend forwardly and are pivotally engaged with the extremities of the cross member 106 on the casting 37. A crank 107 on the inner end of the shaft 101 has a link 108 pivotally engaged therewith and extends rearwardly to engage with a crank 109 operatively connected with a pivotally mounted lever 110.

Obviously, by rocking the lever 110 forwardly or rearwardly, the tongue will be swung to one side or the other for steering the unit.

The bracket 69 is made in two parts $a$ and $b$. The part $a$ is bolted to the respective beam as is indicated at 111 in Figure 16 and has a pivotal connection 112 with the portion $b$ and also a pin and slot connection 114 therewith so that adjustment may be made between the parts $a$ and $b$.

The shank 73 is secured to the part $b$ by means of an eye bolt 115 the eye of which is partially disposed in a recess 116 of the part $b$. Thus the height and the angle of each implement 74 may be adjusted in respect to a prospective supporting beam.

Having thus described one of the units in detail, attention is now directed to the connection between the units particular detail illustration being given in Figures 7, 8 and 9. Uprights 120, 120, and 121 rise from each beam 6, the upright 121 being disposed between and in spaced relation to the uprights 120.

A shaft 123 is mounted in the upper portions of the uprights 120, 120 and 121 and has rotatable thereon rollers 124 on which ride rails 125. Cross members 126 are bolted to the upper ends of the uprights 120, 120 and 121 and prevent the rails 125 from being raised up off the rollers 124.

Cross members 127 are secured across under the rails 125 being fixed in place by bolts 128 or in any other suitable manner. Uprights 129 rise from the ends of the cross members 127 and have cross members 130 connected thereto.

Brackets 131 are secured to the central portions of the rails and has a bolt extending therethrough indicated at 133. A connecting bar 134 is disposed between the units and at its ends is provided with series of openings 135 to receive the bolt 133.

Thus the units may be secured together by means of the connecting bar 134 so as to be disposed the desired distance apart. This connecting bar 134 extends under the cross member 130.

I contemplate using two draft animals with each unit one to each side of the tongue 36. Suitable harness and equalizers will be used for making connection between the draft animals and the hitch structure 23.

As the animals draw the cultivator structure forwardly the cultivating implement will engage in the ground in the usual well known manner and the knives will clear the paths of standing weeds and the like.

The depth of the implement may be controlled by proper manipulation of the levers 92. The apparatus may be steered by means of the levers 110 and the frames of the units may be raised and lowered by manipulating the levers 62. These levers 62, 92 and 110 are readily accessible to a man on the seat 140 mounted at the center of the connecting bar 134.

It is not contemplated that there will be any necessity of shifting levers 34 while the apparatus is in use.

It is thought that the construction, utility and advantages of this cultivator structure will now be quite apparent to those skilled in this art without a more detail description thereof.

The present embodiment of the invention has been disclosed in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A unit for an apparatus of the class described including a cross frame bar, longitudinal frame bars extending rearwardly from the cross frame bars, longitudinal frame bars extending forwardly from the frame cross bar, a wheel truck, means for adjustably connecting the wheel truck with the cross frame bars so that the latter may be raised and lowered, cultivating implements, and means for attaching the implements to the rear longitudinal frame bars, a shaft rockable at the forward ends of the forward longitudinal frame bars, a stub tongue fixed to said shaft and projecting forwardly therefrom, a tongue, and means for swingably mounting the tongue on the stub tongue.

2. A unit for an apparatus of the class described including a cross frame bar, longitudinal frame bars extending rearwardly from the cross frame bars, longitudinal frame bars extending forwardly from the frame cross bar, a wheel truck, means for adjustably connecting the wheel truck with the cross frame bars so that the latter may be raised and lowered, cultivating implements, and means for attaching the implements to the rear longitudinal frame bars, a shaft rockable at the forward ends of the forward longitudinal frame bars, a stub tongue fixed to said shaft and projecting forwardly therefrom, a tongue, and means for swingably mounting the tongue on the stub tongue, a second stub tongue projecting forwardly from the frame cross bar under the first stub tongue, a lever rockable on the first stub tongue, and a link connection between the second stub tongue and the lever.

3. A unit for an apparatus of the class described including a cross frame bar, longitudinal frame bars extending rearwardly from the cross frame bars, longitudinal frame bars extending forwardly from the frame cross bar, a wheel truck, means for adjustably connecting the wheel truck with the cross frame bars so that the latter may be raised and lowered, cultivating implements, and means for attaching the implements to the rear longitudinal frame bars, a shaft rockable at the forward ends of the forward longitudinal frame bars, a stub tongue fixed to said shaft and projecting forwardly therefrom, a tongue, and means for swingably mounting the tongue on the stub tongue, a second stub tongue projecting forwardly from the frame cross bar under the first stub tongue, a lever rockable on the first stub tongue, and a link connection between the second stub tongue and the lever, standards, means for attaching the standards to the cross frame bar, knives diverging rearwardly from each other, means for attaching the forward ends of the rods to the lower ends of the standards.

4. An apparatus of the class described including a frame, a stub tongue projecting forwardly from the frame, a main tongue, a casting on the main tongue rigid thereto and pivotally connected with the stub tongue, a cross member on the casting, links connected with the ends of the cross member and extending rearwardly, a shaft rockable on the frame and having a crank extending upwardly and a crank extending downwardly, said links being engaged with the extremities of said crank, and means for rocking the shaft.

In testimony whereof I affix my signature.

LOWELL ENLO SAVAGE.